United States Patent

Miyake et al.

[11] Patent Number: 6,147,027
[45] Date of Patent: Nov. 14, 2000

[54] ALLOY CATALYST AND PROCESS FOR PRODUCING THE SAME

[75] Inventors: Yoshiharu Miyake, Susono; Naoto Miyoshi, Nagoya; Shinji Tsuji, Numazu, all of Japan

[73] Assignee: Toyota Jidosha Kabushiki Kaisha, Toyota, Japan

[21] Appl. No.: 09/114,968

[22] Filed: Jul. 14, 1998

[30] Foreign Application Priority Data

| Sep. 24, 1997 | [JP] | Japan | 9-258514 |
| Jun. 11, 1998 | [JP] | Japan | 10-163333 |

[51] Int. Cl.⁷ ................................................. B01J 23/00
[52] U.S. Cl. .......................... 502/325; 502/243; 502/326; 502/330; 502/333; 502/334; 502/347; 502/348; 423/213.5; 423/219; 423/239.1
[58] Field of Search ...................... 502/243, 325, 502/326, 330, 333, 334, 347, 348; 423/213.5, 219, 239.1

[56] References Cited

U.S. PATENT DOCUMENTS

| 3,816,344 | 6/1974 | Shimizu et al. | 252/455 R |
| 3,839,225 | 10/1974 | Acres | 252/432 |
| 3,909,452 | 9/1975 | Acres | 252/455 R |
| 3,951,860 | 4/1976 | Acres et al. | 252/432 |
| 3,963,827 | 6/1976 | Acres et al. | 423/239 |
| 4,025,606 | 5/1977 | Acres | 423/245 |
| 4,053,556 | 10/1977 | Acres | 423/239 |
| 4,077,913 | 3/1978 | Acres et al. | 252/462 |
| 4,157,315 | 6/1979 | Michels et al. | 252/458 |
| 4,186,110 | 1/1980 | Jalan et al. | 252/447 |
| 4,192,907 | 3/1980 | Jalan et al. | 429/40 |
| 4,289,737 | 9/1981 | Acres et al. | 423/245 |
| 4,514,274 | 4/1985 | Hesketh et al. | 204/290 F |
| 4,548,921 | 10/1985 | Geus et al. | 502/330 |
| 4,657,888 | 4/1987 | Mesters et al. | 502/331 |
| 5,147,842 | 9/1992 | Funabiki et al. | 502/304 |
| 5,196,175 | 3/1993 | Subramanian et al. | 423/213.5 |
| 5,200,384 | 4/1993 | Funabiki et al. | 502/304 |
| 5,264,200 | 11/1993 | Felthouse et al. | 423/522 |
| 5,620,672 | 4/1997 | Galligan et al. | 423/219 |
| 5,645,930 | 7/1997 | Tsou | 428/328 |
| 5,767,036 | 6/1998 | Freund et al. | 502/185 |
| 5,821,190 | 10/1998 | Kurabayashi et al. | 502/178 |
| 5,880,057 | 3/1999 | Hatano | 502/202 |
| 5,898,014 | 4/1999 | Wu et al. | 502/302 |

FOREIGN PATENT DOCUMENTS

| 60-184922 | 9/1985 | Japan . |
| 0-330-627 | 8/1989 | Japan . |
| 4-284824 | 10/1992 | Japan . |
| 8-48646 | 2/1996 | Japan . |
| 8-224479 | 9/1996 | Japan . |
| 9-103679 | 4/1997 | Japan . |
| WO91/19566 | 12/1991 | WIPO . |
| WO95/32790 | 12/1995 | WIPO . |

*Primary Examiner*—Tom Dunn
*Assistant Examiner*—Cam N. Nguyen
*Attorney, Agent, or Firm*—Oliff & Berridge, PLC

[57] ABSTRACT

The present invention relates to an alloy catalyst for purifying an exhaust gas, and particularly provides an alloy catalyst excellent in nitrogen oxide purification characteristics in the lean region by improving the catalytic activity by coating first catalytic metal particles with a second metal coagulated phase, and a process for producing the same, the alloy catalyst for purifying an exhaust gas having a structure in which metal coagulated phases being applied to and supported by a metal oxide, and comprising first catalytic metal particles having an average particle size of up to 30 nm, and a second metal coagulated phase containing at least one metal, differing from the catalytic metal particles, and applying to the first catalytic metal particles at a coating ratio of at least 45%, and the process for producing an alloy catalyst for purifying an exhaust gas, comprising the steps of allowing first catalytic metal particles having an average particle size of up to 30 nm to adhere onto a metal oxide, and reduction precipitating a second metal coagulated phase containing at least one metal differing from the first catalytic metal particles thereon, and comprising at least one metal selected from the group consisting of Pt, Pd, Au, Rh, Ag and Ir.

9 Claims, No Drawings

ALLOY CATALYST AND PROCESS FOR PRODUCING THE SAME

BACKGROUND OF THE INVENTION

1. Field of the Invention

The present invention relates to an alloy catalyst for purifying exhaust gas and, particularly, to an alloy catalyst having excellent nitrogen oxide purification characteristics in the lean atmosphere, which has improved catalytic activity because first catalytic metal particles are coated with a second metal coagulated phase, and to a process for producing the same.

2. Description of the Prior Art

Precious metals such as Pt, Pd and Rh have heretofore been used either alone or in combination as a catalyst component for catalysts for purifying exhaust gases of automobiles, etc. The precious metals are generally supported on a catalytic carrier. The problem of removing nitrogen oxide from an oxygen-rich atmosphere in a diesel engine exhaust gas has recently become important. However, conventional catalysts for purifying an exhaust gas have a limitation on their purifying capacity. Therefore an alloy catalyst is considered to be suitable as a catalyst for removing nitrogen oxide ($NO_x$) from an oxygen-rich atmosphere. Japanese Unexamined Patent Publication (Kokai) No. 60-184922, for example, discloses, as a known technology in this field, a method wherein an oxide layer is formed as a catalyst for purifying an exhaust gas of diesel engine, and the oxide layer is immersed in a solution so that at least two kinds of catalysts are simultaneously supported. Moreover, Japanese Unexamined Patent Publication (Kokai) No. 4-284824 discloses a method for purifying nitrogen oxide by supporting Pt and a second component Sr, for an oxygen-excessive exhaust gas, on $\gamma$-$Al_2O_3$. Furthermore, Japanese Unexamined Patent Publication (Kokai) No. 9-103679 discloses a purification catalyst for diesel engines which is used at upstream and downstream positions of a path for the exhaust gas and which comprises fine particles upstream and coarse particles downstream.

However, conventional alloy catalysts as catalysts for purifying $NO_x$ in an oxygen-excessive atmosphere have problems such as those described below.

(1) Since the conventional alloy catalysts are solid solution type, the combination of elements is restricted.

(2) When at least two precious metals are supported on a catalytic carrier by adsorption, coprecipitation, or the like procedure, an alloy cannot be formed from those elements which form a solid solution with difficulty.

Accordingly, the development of a technology by which an alloy catalyst as a catalyst for purifying nitrogen oxide in an oxygen-rich atmosphere can be produced relatively simply, and which improves the catalytic activity, is required.

SUMMARY OF THE INVENTION

The present invention is directed to a method for applying different metal coagulated phases without carrying out the conventional procedure by which a solid solution is formed from the metals of different types, and to provide an alloy catalyst in which elements which form a solid solution with difficulty are easily alloyed and which shows an improved catalytic activity, and a process for producing the same.

Furthermore, another object of the present invention is to attain a simple method wherein first metal particles are dispersed on a metal oxide and a different metal coagulated phase is subsequently applied, and to provide an alloy catalyst, by reduction precipitating different metal coagulated phases from solution and a process for producing the same.

Still another object of the present invention is to provide an alloy catalyst which has an optimum composition as an alloy catalyst for nitrogen oxide in an oxygen-rich atmosphere and which comprises composited metal coagulated phases in its structure so as to ensure durability of the catalyst, and a process for producing the same.

The gist of the present invention will be described as follows.

(1) An alloy catalyst for purifying an exhaust gas having a structure in which metal coagulated phases are applied to and supported by a metal oxide, and comprising first catalytic metal particles having an average particle size of up to 30 nm, and a second metal coagulated phase comprising at least one metal, which differs from the catalytic metal particles, and the second metal coagulated phase is applied to the first catalytic metal particles at a coating ratio of at least 45%.

(2) An alloy catalyst according to item (1), wherein the first catalytic metal particles and the second metal coagulated phase comprise at least one metal selected from the group consisting of Pt, Pd, Au, Rh, Ag and Ir.

(3) An alloy catalyst according to item (1) or (2), wherein the first metal particles and the second metal coagulated phase satisfy the relationship of $\theta/M \geq 300$ where $\theta$: coating ratio of the second metal coagulated phase to the first catalytic metal particles, M: weight ratio of the second metal coagulated phase/the first catalytic metal particles.

(4) An alloy catalyst according to item (1) or (2), wherein the first metal particles and the second metal coagulated phase satisfy the relationship of $M \leq 0.15$, where M: weight ratio of the second metal coagulated phase/the first catalytic metal particles.

(5) An alloy catalyst according to item (1) or (2), wherein the first metal particles and the second metal coagulated phase most preferably satisfy the relationship of $0.001 \leq M \leq 0.05$, where M: weight ratio of the second metal coagulated phase/the first catalytic metal particles.

(6) A process, for producing an alloy catalyst for purifying an exhaust gas, which comprises the steps of adhering first catalytic metal particles having an average particle size of up to 30 nm onto a metal oxide, and reduction precipitating a second metal coagulated phase comprising at least one metal differing from the first catalytic metal particles on the metal oxide.

(7) A process, for producing an alloy catalyst for purifying an exhaust gas according to item (6), wherein the second metal coagulated phase is uniformly formed by a vapor deposition, precipitation and sedimentation in a solvent, or a like procedure.

(8) A process for producing an alloy catalyst for purifying an exhaust gas according to item (6), wherein the reduction precipitating is conducted in the range of 6 to 9 pH.

DETAILED DESCRIPTION OF THE PREFERRED EMBODIMENT

Since a metal coagulated phase is present on metal particles in the present invention, the metal coagulated phase differing from the metal particles, a difference between the electronic state of the metal particles of the first phase and that of the second metal coagulated phase varies the electronic state of the metal particles and the surface of the second one. As a result, the catalyst becomes active, and its purification performance is improved. Moreover, in the present invention, the second metal coagulated phase is reduction precipitated on the first metal particles having a small radius of curvature so that the second metal coagulated phase can be easily formed thereon. In the technical feature of the present invention, the second phase is dispersed and uniformly precipitated (crystallized) on the base oxide as nucleus formation sites from the solution and allowed to adhere to the entire surface. There is an optimum range of the size of the first phase metal particles. As explained above, when a metal coagulated phase is present (being applied) onto metal particles, the metal coagulated phase differing from the metal particles, the purification performance of the catalyst is thought to be improved due to the changes in the electronic state of the metal particles and the surface of the phase as described above.

The so-called "ensemble effects" are distinctly observed when the average particle size of the metal particles is up to 30 nm. On the other hand, when the average particle size exceeds 30 nm, the influence of the electronic state of the metal particles becomes significant and, as a result, the influence of that of the metal coagulated phase becomes relatively insignificant. Consequently, the electronic states of the metal particles and the phase surface are not varied, and the "ensemble effects" cannot be exhibited. Moreover, it is desirable that the average particle size of the alloy particles which are the base metal particles of the first phase be up to 40 nm. When the average particle size exceeds 40 nm, the active sites of the catalyst are decreased and the purification performance is deteriorated because the specific surface area is decreased.

Furthermore, the coating ratio of the second metal coagulated phase based on the first metal particles is preferably at least 45% because the effects of applying the metal coagulated phase become insignificant when the coating ratio is less than 45%.

Furthermore, the elements used as the first phase metal particles and the second metal coagulated phase are preferably precious metals, particularly preferably Pt, Pd, Au, Rh, Ag and Ir. In addition, it is a prerequisite of the present invention that the metals in the first metal particles differ from those of the second metal coagulated phase. Synergistic effects of the elements cannot be obtained when the elements are the same. Pt, Pd, Au, Rh, Ag and Ir mentioned above are themselves catalytically active, and as a result an alloy catalyst containing such elements shows an excellent exhaust gas purification performance. Moreover, the metal particles preferably contain one metal selected from Pt, Pd, Au, Rh, Ag and Ir. Presence of precious metal particles containing at least two of the elements mentioned above lessens the effects of applying the metal coagulated phase because the metal coagulated phase is applied more, in amount, to one of the at least two elements.

The present inventors have obtained the following new fact from many experiments.

First, it has been found that the purification performance effect of coating the second metal coagulated phase on the first metal particles is decreased in a case other than the specific relationship between coating ratio $\theta$ of the metal coagulated phase to the metal particles and weight ratio M of the metal coagulated phase to the catalyst metal particles.

Namely, when either one of coating ratio $\theta$ or weight ratio M is excessively large or small, the purification performance effect of coating the second metal coagulated phase on the first metal particles is decreased. The reason why the purification performance effect is decreased is because the influence of the metal particles on the surface of the metal coagulated phase becomes small when either of $\theta$ and M is excessively large.

Contrarily, when either of $\theta$ and M is excessively small, the variation of electric state on the surface will become small, and therefore the purification performance effect will be decreased since the influence of the metal particles on the metal coagulated phase becomes too large. In this case, the condition in which the purification performance effect is most exhibited is not less than a coating ratio $\theta$/weight ratio M of 300.

Next, in respect of thermal stability of the alloy catalyst according to the present invention, when the catalyst is exposed in high temperature atmosphere, the metal particles and the metal coagulated phase are likely to separate since the boundary between the catalyst metal particles and the metal coagulated phase is not thermally stable. As the result, the metal coagulated phase becomes a coarse grain, and therefore the purification performance will be deteriorated.

Furthermore, it has been clarified from experiments that the tendency of the separation between the metal particle and the metal coagulated phase is greatly influenced by weight ratio of the metal coagulated phase/catalyst metal particles.

The thermally stable range is preferably not more than 0.15 of the weight ratio of the second metal phase to the first catalyst metal particles M, and more preferably the range is $0.001 \leq M \leq 0.05$. If weight ratio exceeds 0.15, the metal particles and the metal coagulated phase can be separated as afore-mentioned, as the result, the metal phase forms coarse grains and therefore the purification performance will be decreased.

Although vapor deposition, precipitation and sedimentation in a solvent, or the like procedure, are suitable as a methods for layering the metal coagulated phases in the present invention, any of the procedures can be used so long as the composition and size of the particles are uniform. Moreover, when at least two metal coagulated phases are applied, it is satisfactory to apply at least two phases simultaneously or successively in accordance with a desired purification performance.

There is no limitation on the type of the method for synthesizing the metal particles in the present invention so long as the method gives metal particles having an average particle size of up to 30 nm. The method can be adopted when the metal particles can be uniformly dispersed. For example, adsorption of the constitution of the second phase to the acid points and base points on the catalyst carrier (metal oxide), an ion-exchange procedure of the metallic ion in the solution and reduction precipitation in the solution are preferred methods.

Reduction precipitation in a solution is most preferred as a method for applying the metal coagulated phases. The metal ions in the solution are reduction precipitated at sites having a small curvature, namely at protrusions, etc. of the metal particles and catalytic carrier as nucleation sites. Consequently, a coating ratio of the metal coagulated phase of at least 45% can be easily obtained. A coating ratio of at least 45% is difficult to attain by the conventional synthesizing method wherein coprecipitation, etc. is conducted, and then heat treatment is carried out.

Furthermore, the reduction precipitation of the present invention is carried out preferably at a pH of 6 to 9. When the pH is outside the range, the number of metal ions which are adsorbed to the acid points and base points of the catalytic carrier, or neutralized and precipitated, is increased. As a result, the amount of the metal coagulated phase applied to the metal particles is decreased, and the purification performance of the alloy catalyst thus obtained becomes insignificant.

In addition, the types of reducing agents and reagents for adjusting the pH of a solution are satisfactory so long as they are conventionally used ones. However, it is preferred to avoid combination of a reducing agent and a reagent for adjusting the pH which mutually react in the solution to reduce the applied amount of the metal coagulated phases. Moreover, it is preferred not to use a reagent which reacts with ions containing metal coagulated phase elements to form insoluble compounds.

The present invention will be explained below in detail with reference to examples.

EXAMPLES

Example 1

A γ-$Al_2O_3$ powder was added to an aqueous solution containing $Pt(NO_2)_2(NH_3)_2$ ($9.75 \times 10^{-2}$ wt. %), and the mixture was stirred for 3 hours, followed by drying the mixture in air at 120° C. for 24 hours. The dried product was then heat treated in air at 300° C. for 2 hours to give at 1 wt. % Pt/$Al_2O_3$ powder I.

The same procedure was repeated except that the concentration of $Pt(NO_2)_2(NH_3)_2$ was varied to give the following products: a 1.8 wt. % Pt/$Al_2O_3$ powder II, a 1.41 wt. % Pt/$Al_2O_3$ powder III and a 0.61 wt. % Pt/$Al_2O_3$ powder IV.

All the powders I, II, III and IV had a Pt particle size of up to 10 nm.

Next, $HAuCl_4 \cdot 4H_2O$ ($2.16 \times 10^{-2}$ wt. %), $Na_2S_2O_3 \cdot 5H_2O$ ($1.04 \times 10^{-1}$ wt. %), $Na_2SO_3$ ($2.64 \times 10^{-1}$ wt. %) and $C_6H_7NaO_6 \cdot H_2O$ (1.15 wt. %) were added to ion-exchange treated water at 60° C. containing the 1.01 wt. % Pt/$Al_2O_3$ powder I (1.03 wt. %) to give an aqueous solution. The aqueous solution was stirred for 24 hours while the pH was adjusted to 6.21 to reduction precipitate Au. The mixture was then filtered, and the residue was washed with ion-exchange treated water at 60° C. The washed residue was then dried in air at 120° C. for 2 hours. The dried residue was then heat treated in air at 500° C. for 2 hours to give a 2 wt. % (Pt-Au)/$Al_2O_3$ alloy catalyst A having a Pt/Au weight ratio of 5/5, and a total content of Pt and Au of 2% by weight.

A 2 wt. % (Pt—Au)/$Al_2O_3$ alloy catalyst B having a Pt/Au weight ratio of 5/5 was obtained in the same manner as in the preparation of the catalyst A except that $HAuCl_4 \cdot 4H_2O$ ($2.19 \times 10^{-2}$ wt. %), $Na_2S_2O_3 \cdot 5H_2O$ ($1.05 \times 10^{-1}$ wt. %), $Na_2SO_3$ ($2.67 \times 10^{-1}$ wt. %) and $C_6H_7NaO_6 \cdot H_2O$ (1.05 wt. %) were added to ion-exchange treated water at 60° C. containing the 1.01 wt. % Pt/$Al_2O_3$ powder (1.03 wt. %), and that the pH was adjusted to 8.29.

Moreover, a 2 wt. % (Pt—Au)/$Al_2O_3$ alloy catalyst C having a Pt/Au weight ratio of 9/1 was obtained in the same manner as in the preparation of the catalyst A except that $HAuCl_4 \cdot 4H_2O$ ($2.04 \times 10^{-2}$ wt. %), $Na_2S_2O_3 \cdot 5H_2O$ ($9.40 \times 10^{-2}$ wt. %), $Na_2SO_3$ ($2.41 \times 10^{-1}$ wt. %) and $C_6H_7NaO_6 \cdot H_2O$ (9.45 wt. %) were added to ion-exchange treated water at 60° C. containing the 1.80 wt. % Pt/$Al_2O_3$ powder II (4.69 wt. %), and that the pH was adjusted to 7.78.

Furthermore, a 2 wt. % (Pt—Au)/$Al_2O_3$ alloy catalyst D having a Pt/Au weight ratio of 7/3 was obtained in the same manner as in the preparation of the catalyst A except that $HAuCl_4 \cdot 4H_2O$ ($2.17 \times 10^{-2}$ wt. %), $Na_2S_2O_3 \cdot 5H_2O$ ($1.03 \times 10^{-1}$ wt. %), $Na_2SO_3$ ($2.63 \times 10^{-1}$ wt. %) and $C_6H_7NaO_6 \cdot H_2O$ (1.03 wt. %) were added to ion-exchange treated water at 60° C. containing the 1.41 wt. % Pt/$Al_2O_3$ powder III (1.70 wt. %), and that the pH was adjusted to 8.20.

Moreover, a 2 wt. % (Pt—Au)/$Al_2O_3$ alloy catalyst E having a Pt/Au weight ratio of 3/7 was obtained in the same manner as in the preparation of the catalyst A except that $HAuCl_4 \cdot 4H_2O$ ($2.15 \times 10^{-2}$ wt. %), $Na_2S_2O_3 \cdot 5H_2O$ ($1.03 \times 10^{-1}$ wt. %), $Na_2SO_3$ ($2.63 \times 10^{-1}$ wt. %) and $C_6H_7NaO_6 \cdot H_2O$ (1.03 wt. %) were added to ion-exchange treated water at 60° C. containing the 0.61 wt. % Pt/$Al_2O_3$ powder IV ($7.24 \times 10^{-1}$ wt. %), and that the pH was adjusted to 8.33.

Furthermore, $Pt(NO_3)_2$ ($2.28 \times 10^{-2}$ wt. %), $Na_2SO_3$ ($1.12 \times 10^{-1}$ wt. %) and $C_6H_7NaO_6 \cdot H_2O$ ($3.89 \times 10^{-1}$ wt. %) were added to ion-exchange treated water at 40° C. containing the 1.01 wt. % Pt/$Al_2O_3$ powder I (1.06 wt. %) to give an aqueous solution. The aqueous solution was stirred for 24 hours while the pH was adjusted to 8.01 to reduction precipitate Pd. The mixture was then filtered, and the residue was washed with ion-exchange treated water at 40° C. The washed powder was then dried in air at 120° C. for 2 hours. The residue was then heat treated in air at 500° C. for 2 hours to give a 2 wt. % (Pt—Pd)/$Al_2O_3$ alloy catalyst F having a Pt/Pd weight ratio of 5/5, and a total content of Pt and Pd of 2% by weight.

All the catalysts A, B, C, D, E and F had an alloy particle size of up to 10 nm.

Example 2

A γ-$Al_2O_3$ powder was added to an aqueous solution containing $Pd(NO_3)_2$ ($1.28 \times 10^{-1}$ wt. %), and the mixture was stirred for 3 hours, followed by drying the mixture in air at 120° C. for 24 hours. The dried product was heat treated in air at 300° C. for 2 hours to give a 1.01 wt. % Pd/$Al_2O_3$ powder V. The powder V had a Pd particle size of up to 10 nm.

$HPtCl_6 \cdot 6H_2O$ ($2.79 \times 10^{-2}$ wt. %), $Na_2S_2O_3 \cdot 5H_2O$ ($1.05 \times 10^{-1}$ wt. %), $Na_2SO_3$ ($2.67 \times 10^{-1}$ wt. %) and $C_6H_7NaO_6$ (1.05 wt. %) were added to an aqueous solution at 60° C. containing the 1.01 wt. % Pd/$Al_2O_3$ powder V (1.03 wt. %) to give an aqueous solution. The aqueous solution was stirred for 24 hours while the pH was adjusted to 7.81 to reduction precipitate Pt. The mixture was then filtered, and the residue was washed with ion-exchange treated water at 60° C. The washed powder was then dried in air at 120° C. for 2 hours. The dried product was then heat treated in air at 500° C. for 2 hours to give a 2 wt. % (Pd—Pt)/$Al_2O_3$ alloy catalyst G having a Pd/Pt weight ratio of 5/5, and a total content of Pd and Pt of 2% by weight. The catalyst G had an alloy particle size of up to 10 nm.

Example 3

The 1.80 wt. % Pt/$Al_2O_3$ powder II was heat treated in air at 800° C. for 5 hours to give a 1.80 wt. % Pt/$Al_2O_3$ powder VI having a Pt particle size of 25 nm.

A 2 wt. % (Pt—Au)/$Al_2O_3$ alloy comparative catalyst H having a Pt/Au weight ratio of 9/1 was obtained in the same manner as in the preparation of the catalyst A except that $HAuCl_4 \cdot 4H_2O$ ($2.04 \times 10^{-2}$ wt. %), $Na_2S_2O_3 \cdot 5H_2O$ ($9.40 \times 10^{-2}$ wt. %), $Na_2SO_3$ ($2.41 \times 10^{-1}$ wt. %) and $C_6H_7NaO_6$ ($9.45 \times 10^{-2}$ wt. %) were added to ion-exchange treated water at 60° C. containing the 1.80 wt. % Pt/Al$_2$O$_3$ powder VI (4.69 wt. %), and that the pH was adjusted to 7.91. The catalyst H had an alloy particle size of 27 nm.

Comparative Example 1

A γ-Al$_2$O$_3$ powder was added to an aqueous solution containing Pt(NO$_2$)$_2$(NH$_3$)$_2$ (8.10×10$^{-2}$ wt. %), and HAuCl$_4$.4H$_2$O (1.03×10$^{-1}$ wt. %), and the mixture was stirred for 3 hours, followed by drying the mixture in air at 120° C. for 24 hours. The dried product was then fired at 300° C. for 2 hours to give a 2 wt. % (Pt—Au)/Al$_2$O$_3$ comparative catalyst I having a Pt/Au ratio of 5/5 and a total content of Pt and Au of 2% by weight. In addition, the pH of the aqueous solution was adjusted to 2.04 during stirring. The catalyst I contained Pt particles having a particle size of up to 10 nm and Au particles having a particle size of 21 nm.

Comparative Example 2

A 2 wt. % (Pt—Au)/Al$_2$O$_3$ alloy comparative catalyst J having a Pt/Au weight ratio of 5/5 was obtained by the same procedure as in the preparation of the catalyst A except that HAuCl$_4$.4H$_2$O (2.21×10$^{-2}$ wt. %), Na$_2$S$_2$O$_3$.5H$_2$O (1.06× 10$^{-1}$ wt. %), Na$_2$SO$_3$ (3.51×10$^{-2}$ wt. %) and C$_6$H$_7$NaO$_6$ (5.30×10$^{-2}$ wt. %) were added to ion-exchange treated water at 60° C. containing the 1.01 wt. % Pt/Al$_2$O$_3$ powder I (1.04 wt. %) and that the pH of the aqueous solution was adjusted to 5.72. The catalyst J contained alloy particles having a particle size of up to 10 nm and Au particles having a particle size of 26 nm.

A 2 wt. % (Pt—Au)/Al$_2$O$_3$ alloy comparative catalyst K having a Pt/Au weight ratio of 5/5 was obtained in the same manner as in the preparation of the catalyst A except that HAuCl$_4$.4H$_2$O (2.19×10$^{-2}$ wt. %), Na$_2$S$_2$O$_3$.5H$_2$O (1.05× 10$^{-1}$ wt. %), Na$_2$SO$_3$ (3.48×10$^{-1}$ wt. %) and C$_6$H$_7$NaO$_6$ (1.05 wt. %) were added to ion-exchange treated water at 60° C. containing the 1.01 wt. % Pt/Al$_2$O$_3$ powder I (1.03 wt. %), and that the pH of the aqueous solution was adjusted to 9.81. The catalyst contained alloy particles having a particle size of up to 10 nm and Au particles having a particle size of 64 nm.

Comparative Example 3

The 1.01 wt. % Pt/Al$_2$O$_3$ power I was heat treated in air at 1,000° C. for 5 hours to give a 1.01 wt. % Pt/Al$_2$O$_3$ powder VII having a Pt particle size of 43 nm.

A 2 wt. % (Pt—Au)/Al$_2$O$_3$ comparative catalyst L having a Pt/Au weight ratio of 5/5 was obtained in the same manner as in the preparation of the catalyst A except that HAuCl$_4$.4H$_2$O (2.19×10$^{-2}$ wt. %), Na$_2$S$_2$O$_3$.5H$_2$O (1.05× 10$^{-1}$ wt. %), Na$_2$SO$_3$ (2.67×10$^{-1}$ wt. %) and C$_6$H$_7$NaO$_6$ (1.05 wt. %) were added to ion-exchange treated water at 60° C. containing the 1.01 wt. % Pt/Al$_2$O$_3$ powder VII (1.03 wt. %), and that the pH of the aqueous solution was adjusted to 8.17. The catalyst L contained alloy particles having a particle size of 47 nm.

In the examples, the alloy particle size was measured by X-ray diffraction, and the composition analysis was performed with fluorescence X-rays. In addition, the description of "a particle size of up to 10 nm" signifies that the alloy particles are not greater than the measurement limit of the X-ray diffraction apparatus.

Evaluation tests of the exhaust gas purification performance of the catalysts in the present examples were subsequently conducted, and the results will be explained.

Evaluation of the exhaust gas purification performance was carried out on catalysts corresponding to the abovementioned catalyst marks, respectively and having characteristics as shown in Tables 1 and 2, under the following conditions:

gas composition: 1,000 ppm CO+667 ppm C$_3$H$_6$+250 ppm NO+7.3% O$_2$+6.7% CO$_2$+5% H$_2$O, gas space velocity: 150,000 h$^{-1}$, and temperature lowering rate from 500 to 100° C.: evaluation during lowering temperature at a rate of 10° C./min.

The temperature at which the purification ratio of C$_3$H$_6$ defined by the formula (1) mentioned below became 50%, and the maximum purification ratio of NO were measured as a gas purification performance, and the results are shown in Table 2.

Catalytic conversion efficiency={(inlet gas concentration−outlet gas concentration)/(inlet gas concentration)}×100    (1)

TABLE 1

| Sample No. | | Ref. Composition | Metal Particles Element | Metal Particles Particle size (nm) | Metal coagulated phase Element | Alloy particles (nm) | pH of aqueous solution during reduction precipitation |
|---|---|---|---|---|---|---|---|
| Present invention | 1 | A Pt:Au = 5:5 | Pt | ≦10 | Au | ≦10 | 6.21 |
| | 2 | B Pt:Au = 5:5 | Pt | ≦10 | Au | ≦10 | 8.29 |
| | 3 | C Pt:Au = 9:1 | Pt | ≦10 | Au | ≦10 | 7.78 |
| | 4 | D Pt:Au = 7:3 | Pt | ≦10 | Au | ≦10 | 8.20 |
| | 5 | E Pt:Au = 3:7 | Pt | ≦10 | Au | ≦10 | 8.33 |
| | 6 | F Pt:Pd = 5:5 | Pt | ≦10 | Pd | ≦10 | 8.01 |
| | 7 | G Pd:Pt = 5:5 | Pd | ≦10 | Pt | ≦10 | 7.81 |
| | 8 | H Pt:Au = 9:1 | Pd | 25 | Au | 27 | 7.91 |
| Comparative example | 9 | I Pt:Au = 5:5 | Pt and Au being supported on Al$_2$O$_3$ simultaneously: Pt ≦ 10 nm, Au = 21 nm | | | | 2.04 |
| | 10 | J Pt:Au = 5:5 | Pt | ≦10 | Au | alloy ≦ 10 nm Au = 26 nm | 5.72 |
| | 11 | K Pt:Au = 5:5 | Pt | ≦10 | Au | alloy ≦ 10 nm Au = 64 nm | 9.81 |
| | 12 | L Pt:Au = 5:5 | Pt | 43 | Au | 47 | 8.17 |

TABLE 2

(Continued from Table 1)

| Sample No. | | Temp at which catalytic conversion efficiency of $C_3H_6$ became 50% (° C.) | Maximum catalytic conversion efficiency of NO (%) |
|---|---|---|---|
| Present invention | 1 | 228 | 44.7 |
| | 2 | 233 | 42.5 |
| | 3 | 192 | 60.4 |
| | 4 | 219 | 47.2 |
| | 5 | 240 | 38.2 |
| | 6 | 187 | 39.8 |
| | 7 | 173 | 41.0 |
| | 8 | 233 | 50.7 |
| Comparative example | 9 | 317 | 11.7 |
| | 10 | 291 | 20.1 |
| | 11 | 260 | 29.4 |
| | 12 | 269 | 28.6 |

It can be understood from Tables 1 and 2 that conclusions as described below can be drawn. The samples Nos. 1 to 8 of the present invention show an excellent catalytic conversion efficiency. On the other hand, the sample No. 9 of comparative example has no applied metal coagulated phase, and as a result shows a deteriorated catalytic conversion efficiency compared with the present invention.

Furthermore, coarse Au particles are formed in the sample No. 10 of comparative example because of the pH of less than 6, consequently the amount of the applied Au phase is decreased. As a result, the effect of the sample No. 10 is decreased, and the catalytic conversion efficiency is deteriorated compared with the samples of the present invention.

Still furthermore, coarse Au particles are formed in the sample No. 11 of comparative example because of the pH exceeding 9, and consequently the amount of the applied Au phase is decreased. As a result, the effect of the sample No. 11 is decreased, and the catalytic conversion efficiency is deteriorated compared with the samples of the present invention. The particle size of the metal particles (Pt) of the sample No. 12 of comparative example exceeds 30 nm, and the effect of applying the metal coagulated phase is not manifested. As a result, the catalytic conversion efficiency of the sample No. 12 is deteriorated compared with the samples of the present invention.

Next, in the measurement of the coating ratio of the second phase in the examples, the coating ratio of the metal coagulated phase was calculated from the number of surface-exposed Pt atoms determined by the adsorption amount of CO at 50° C.

In addition, since CO is not adsorbed to the Au atoms in the Pt—Au catalysts, the coating ratio was calculated by the formula (2) mentioned below. The results are shown in Table 3.

TABLE 3

| Sample No. | | Ref. Composition | Coating ratio (%) |
|---|---|---|---|
| Present invention | 1 | A Pt:Au = 5:5 | 48.4 |
| | 2 | B Pt:Au = 5:5 | 73.6 |
| | 3 | C Pt:Au = 9:1 | 78.7 |
| | 4 | D Pt:Au = 7:3 | 73.2 |

TABLE 3-continued

| Sample No. | | Ref. Composition | Coating ratio (%) |
|---|---|---|---|
| | 5 | E Pt:Au = 3:7 | 48.9 |
| | 6 | F Pt:Pd = 5:5 | (73.0) |
| | 7 | G Pd:Pt = 5:5 | (45.7) |
| | 8 | H Pt:Au = 9:1 | — |
| Comparative example | 9 | I Pt:Au = 5:5 | — |
| | 10 | J Pt:Au = 5:5 | 8.0 |
| | 11 | K Pt:Au = 5:5 | 5.0 |
| | 12 | L Pt:Au = 5:5 | — |

Note: The Pt particles were so large that CO were not absorbed, and the coating ratio could not be calculated.

Coating ratio=(number of Pt atoms on the surface prior to reduction precipitation−number of Pt atoms on the surface subsequent to reduction precipitation)/(number of Pt atoms prior to reduction precipitation of Au)×100     (2)

The coating ratio of the Pt—Pd catalysts was calculated using the formula (2). However, the Pd atoms somewhat adsorbed CO, and as a result the calculated values lowered actual coating ratios.

It can be concluded from these tables that the catalysts according to the present invention have a coating ratio of at least 45% of a metal coagulated phase, and show an excellent purification performance.

Example 4

A $\gamma$-$Al_2O_3$ powder was added to an aqueous solution containing $Pt(NO_2)_2(NH_3)_2$ ($9.98 \times 10^{-2}$ wt. %), and the mixture was stirred for 3 hours, followed by drying the mixture in air at 120° C. for 24 hours. The dried product was then heat treated in air at 300° C. for 2 hours to give at 1.80 wt. % $Pt/Al_2O_3$ powder.

Next, $HAuCl_4 \cdot 4H_2O$ ($2.04 \times 10^{-2}$ wt. %), $Na_2S_2O_3 \cdot 5H_2O$ ($9.40 \times 10^{-2}$ wt. %), $Na_2SO_3$ ($2.41 \times 10^{-1}$ wt. %) and $C_6H_7NaO_6$ ($9.45 \times 10^{-1}$ wt. %) were added to ion-exchange treated water at 60° C. containing the 1.80 wt. % $Pt/Al_2O_3$ powder (4.69 wt. %) to give an aqueous solution. The aqueous solution was stirred for 24 hours while the pH was adjusted to 7.78 to reduction precipitate Au. The mixture was then filtered, and the residue was washed with ion-exchange treated water at 60° C. The washed residue was then dried in air at 120° C. for 2 hours. The dried residue was then heat treated in air at 500° C. for 2 hours to give a 2 wt. % (Pt—Au)/$Al_2O_3$ alloy catalyst A2 having 0.13 of a second metal coagulated phase (Au)/first catalyst metal particles (Pt) weight ratio, and in which a coating ratio a of second metal coagulated phase to first catalyst metal particles is 62%.

Under the same conditions except various concentration as the example 4, the alloy catalysts shown in Tables 4 and 5 were obtained.

TABLE 4

| | No. | Catalyst | Weight ratio M | Coating ratio θ (%) | θ/M |
|---|---|---|---|---|---|
| Present invention | 13 | A2 | 0.130 | 67 | 515 |
| | 14 | B2 | 0.106 | 69 | 651 |
| | 15 | C2 | 0.227 | 70 | 308 |
| | 16 | D2 | 0.110 | 60 | 545 |
| | 17 | E2 | 0.116 | 61 | 526 |
| | 18 | F2 | 0.096 | 60 | 625 |

TABLE 4-continued

| No. | | Catalyst | Weight ratio M | Coating ratio θ (%) | θ/M |
|---|---|---|---|---|---|
| | 19 | G2 | 0.053 | 55 | 1038 |
| | 20 | H2 | 0.022 | 57 | 2591 |
| | 21 | I2 | 0.011 | 54 | 4909 |
| | 22 | J2 | 0.006 | 56 | 9333 |
| Comparative | 23 | K2 | 0.49 | 68 | 139 |
| example | 24 | L2 | 1.06 | 64 | 60 |

θ: Coating ratio of second metal coagulated phase to first catalyst metal particles
M: Weight ratio of second metal coagulated phase/first catalyst metal particles

TABLE 5

(Continued from Table 4)

| No. | | Catalyst | Temp at which catalytic conversion efficiency of $C_3H_6$ became 50% (° C.) | Maximum catalytic conversion efficiency of NO (%) |
|---|---|---|---|---|
| Present | 13 | A2 | 196 | 61 |
| invention | 14 | B2 | 212 | 48 |
| | 15 | C2 | 210 | 51 |
| | 16 | D2 | 199 | 52 |
| | 17 | E2 | 207 | 49 |
| | 18 | F2 | 194 | 56 |
| | 19 | G2 | 192 | 57 |
| | 20 | H2 | 191 | 54 |
| | 21 | I2 | 192 | 51 |
| | 22 | J2 | 200 | 52 |
| Comparative | 23 | K2 | 224 | 45 |
| example | 24 | L2 | 246 | 41 |

All catalysts comprise Pt of the first metal particles and Au of the second coagulated phase.

In the examples, the alloy particle size was measured by X-ray diffraction, and the composition analysis was performed with fluorescence X-rays. The alloy particles are not greater than 10 nm of the measurement limit of the X-ray diffraction apparatus.

In the Tables, the weight ratio M is calculated from the result of fluorescence X-ray analysis, and an amount of CO adsorption is decreased by Au coagulation since Au atom does not adsorb CO at 50° C. Therefore, the coating ratio θ is estimated by calculation from the equation (2) with the number of Pt atom which were estimated from an amount of CO adsorption before and after Au coagulation.

Coating ratio=(number of Pt atoms on the surface prior to reduction precipitation−number of Pt atoms on the surface subsequent to reduction precipitation)/(number of Pt atoms prior to reduction precipitation of Au)×100   (2)

Evaluation tests of the exhaust gas purification performance of the catalyst subsequently conducted.

Evaluation of the exhaust gas purification performance was carried out under the following conditions:

gas composition: 1,000 ppm CO+670 ppm $C_3H_6$+250 ppm NO+7.3% $O_2$+6.7% $CO_2$+5% $H_2O$, gas space velocity: 150,000 $h^{-1}$, and temperature lowering rate from 500 to 100° C.: evaluation during lowering temperature at a rate of 10° C./min.

The temperature at which the catalytic conversion efficiency of $C_3H_6$ defined by the formula (1) mentioned below became 50%, and the maximum catalytic conversion efficiency of NO were measured as a gas purification performance, and the results are summarily shown in Tables 4 and 5.

Catalytic conversion efficiency={(inlet gas concentration−outlet gas concentration)/(inlet gas concentration)}×100   (1)

All catalysts show the excellent purification performance by the effect of the second metal coagulated phase, and Nos. 13 to 22 of the present invention show the more preferable purification performance by satisfying coating ratio θ/weight ratio M≧300.

Example 5

A γ-$Al_2O_3$ powder was added to an aqueous solution containing $Pt(NO_2)_2(NH_3)_2$ (9.98×10$^{-2}$ wt. %), and the mixture was stirred for 3 hours, followed by drying the mixture in air at 120° C. for 24 hours. The dried product was then heat treated in air at 300° C. for 2 hours to give a 1.80 wt. % Pt/$Al_2O_3$ powder.

Next, $HAuCl_4 \cdot 4H_2O$ (2.04×10$^{-2}$ wt. %), $Na_2S_2O_3 \cdot 5H_2O$ (9.40×10$^{-2}$ wt. %), $Na_2SO_3$ (2.41×10$^{-1}$ wt. %) and $C_6H_7NaO_6$ (9.45×10$^{-1}$ wt. %) were added to ion-exchange treated water at 60° C. containing the 1.80 wt. % Pt/$Al_2O_3$ powder (4.69 wt. %) to give an aqueous solution. The aqueous solution was stirred for 24 hours while the pH was adjusted to 7.78 to reduction precipitate Au. The mixture was then filtered, and the residue was washed with ion-exchange treated water at 60° C. The washed residue was then dried in air at 120° C. for 2 hours. The dried residue was then heat treated in air at 500° C. for 2 hours to give a 2 wt. % (Pt—Au)/$Al_2O_3$ alloy catalyst A3 having a second metal coagulated phase (Au) first catalyst metal particles (Pt) weight ratio of 0.13.

Under the same conditions except various concentration as the example 5, the alloy catalysts shown in Tables 6 and 7 were obtained.

TABLE 6

| | | | | Temp at which catalytic conversion efficiency became 50% (° C.) | | |
|---|---|---|---|---|---|---|
| No. | | Catalyst | Weight ratio M | New catalyst | 700° C. endurance treatment | 800° C. endurance treatment |
| Present | 25 | A3 | 0.130 | 196 | 238 | 260 |
| invention | 26 | B3 | 0.096 | 194 | 239 | 254 |
| | 27 | C3 | 0.053 | 192 | 236 | 244 |
| | 28 | D3 | 0.022 | 191 | 226 | 240 |
| | 29 | E3 | 0.011 | 192 | 224 | 239 |
| | 30 | F3 | 0.006 | 200 | 219 | 230 |
| Comparative | 31 | G3 | 0.227 | 210 | 255 | 277 |
| tive example | 32 | H3 | 0.486 | 224 | 268 | 278 |

TABLE 7

(Continued from Table 6)

|  |  |  | Maximum catalytic conversion efficiency of NO (%) | |
| --- | --- | --- | --- | --- |
| No. |  | Catalyst | New catalyst | 700° C. endurance treatment | 800° C. endurance treatment |
| Present invention | 25 | A3 | 57 | 43 | 37 |
|  | 26 | B3 | 56 | 44 | 36 |
|  | 27 | C3 | 57 | 47 | 44 |
|  | 28 | D3 | 54 | 49 | 44 |
|  | 29 | E3 | 51 | 54 | 45 |
|  | 30 | F3 | 52 | 52 | 51 |
| Comparative example | 31 | G3 | 51 | 36 | 34 |
|  | 32 | H3 | 45 | 31 | 28 |

All catalysts comprise Pt of the first metal particles and Au of the second coagulated phase in which the Au coating ratio is 50 to 70%.

In the examples, the alloy particle size was measured by X-ray diffraction, and the composition analysis was performed with fluorescence X-rays. The alloy particles are not greater than 10 nm of the measurement limit of the X-ray diffraction apparatus.

In the Tables, the weight ratio M is calculated from the result of fluorescence X-ray analysis.

Evaluation tests of the exhaust gas purification performance of the catalysts subsequently conducted in new catalysts and after endurance treatment.

Evaluation of the exhaust gas purification performance was carried out under the following conditions:

[Endurance running conditions]:
   gas composition: 1,000 ppm CO+670 ppm $C_3H_6$+500 ppm NO+6.5% $O_2$+10% $CO_2$+10$H_2O$
   temperature: 700, 800° C.
   time: 5 hours

[Exhaust gas purification performance]
   gas composition: 1,000 ppm CO+670 ppm $C3H_6$+250 ppm NO+7.3% $O_2$+6.7% $CO_2$+5% $H_2O$,
   gas space velocity: 150,000 $h^{-1}$, and
   temperature lowering rate from 500 to 100° C.: evaluation during lowering temperature at a rate of 10° C./min.

The temperature at which the catalytic conversion efficiency of $C_3H_6$ defined by the formula (1) mentioned below became 50%, and the maximum catalytic conversion efficiency of NO were measured as a gas purification performance, and the results are summarily shown in Tables 6 and 7.

Catalytic conversion efficiency={(inlet gas concentration−outlet gas concentration)/(inlet gas concentration)}×100   (1)

Nos. 25 to 30 of the present invention show excellent heat resistance.

Furthermore, Nos. 27 to 30 which are in the range of weight ratio M of 0.005≦M≦0.05 show excellent exhaust purification performance after endurance running at 800° C.

Nos. 31 and 32 of the comparative examples have deteriorated heat resistance due to formation of coarse Au grains after endurance running.

In addition, in the catalyst of the present invention, precious metals are reduction precipitated on a powder to become a catalytic carrier such as $Al_2O_3$ in advance, and the powder is monolithically coated. The yield of the precious metals, therefore, becomes 100%. In this respect, no problem arises from the yield of the precious metals in contrast to conventional automobile catalysts. Moreover, in the method of supporting precious metals by adsorption, etc., the precious metals are preferentially adsorbed to base or acid points. Consequently, the positions of catalytic active sites cannot be controlled. However, in the present invention, when shapes such as protrusions having a small curvature are formed on the catalytic carrier surface, the alloy particles are preferentially formed in the portions. Catalytic active sites can, therefore, be freely controlled by the catalytic carrier surface shapes.

Furthermore, since metal elements are successively reduction precipitated, the structure of the alloy particles which are catalytic active sites, namely the thickness of the metal coagulated phases, the order of application of the phases, and the like, can be easily controlled. That is, the properties of the catalytic active sites can be varied.

It can be seen from what is described above that catalysts having various purifying performances can be obtained by combining with the control of the catalytic carrier surface shape and the catalysts can be used in various applications.

In conventional catalysts, the precious metals are often poisoned by sintering or with sulfur to cause problems. However, it has become possible to inhibit the poisoning by sintering or with sulfur in the present invention by using a chemically stable element (such as Au) as a metal coagulated phase on the alloy particles.

According to the present invention, application of the catalyst metal coagulated phases produces synergistic effects of the catalytic activity of each phase, and the catalytic conversion efficiency of HC and $NO_x$ and heat resistance in the lean and high temperature region in the purification of an exhaust gas are improved. Moreover, the first metal particles are coated with the second phase by reduction precipitation in the production process. A catalyst with applied different metal coagulated phases can, therefore, be obtained by relatively simple adjustment of a solution concentration.

What is claimed is:

1. An alloy catalyst for purifying an exhaust gas having a structure in which metal coagulated phases are applied to and supported by a metal oxide, and comprising first catalytic metal particles having an average particle size of up to 30 nm, and a metallic second metal coagulated phase comprising at least one metal, which differs from the catalytic metal particles, and said second metal coagulated phase is applied to said first catalytic metal particles at a coating ratio of at least 45% and at most 80%;

wherein the first catalytic metal particles and the second metal coagulated phase comprise at least one metal selected from the group consisting of Pt, Pd, Au, Rh and Ir.

2. An alloy catalyst according to claim 1, wherein the first metal particles and the second metal coagulated phase satisfy the relationship of θ/M≧300, where θ: coating ratio of the second metal coagulated phase to the first catalytic metal particles, M: weight ratio of the second metal coagulated phase the first catalytic metal particles.

3. An alloy catalyst according to claim 1, wherein the first metal particles and the second metal coagulated phase satisfy the relationship of M≦0.15, where M: weight ratio of the second metal coagulated phase/the first catalytic metal particles.

4. An alloy catalyst according to claim 1, wherein the first metal particles and the second metal coagulated phase satisfy the relationship of $0.001 \leq M \leq 0.05$, where M: weight ratio of the second metal coagulated phase/the first catalytic metal particles.

5. A process for producing the alloy catalyst for purifying an exhaust gas of claim 1, which comprises the steps of adhering first catalytic metal particles having an average particle size of up to 30 nm onto a metal oxide, and layering a second metal coagulated phase comprising at least one metal differing from said first catalytic metal particles on the metal oxide.

6. A process for producing an alloy catalyst for purifying an exhaust gas according to claim 5, wherein the second metal coagulated phase is uniformly formed by the applying method for layering which is selected from vapor deposition, precipitation or sedimentation in a solvent.

7. A process for producing an alloy catalyst for purifying an exhaust gas according to claim 5, wherein the applying method for layering is reduction precipitating that is conducted in the range of 6 to 9 pH.

8. The alloy catalyst for purifying an exhaust gas of claim 1, wherein said coating ratio is at most 70%.

9. The alloy catalyst for purifying an exhaust gas of claim 1, wherein said coating ratio is at most 78.7%.

* * * * *